(12) United States Patent
Crowley et al.

(10) Patent No.: US 10,438,287 B2
(45) Date of Patent: Oct. 8, 2019

(54) SYSTEMS AND METHODS FOR TRANSFORMING TRADING PORTFOLIOS

(71) Applicant: Intercontinental Exchange Holdings, Inc., Atlanta, GA (US)

(72) Inventors: Christopher J. Crowley, Brooklyn, NY (US); Peter Barsoom, New York, NY (US)

(73) Assignee: Intercontinental Exchange Holdings, Inc., Atlanta, GA (US)

( * ) Notice: Subject to any disclaimer, the term of this patent is extended or adjusted under 35 U.S.C. 154(b) by 656 days.

(21) Appl. No.: 14/700,347

(22) Filed: Apr. 30, 2015

(65) Prior Publication Data

US 2015/0262299 A1    Sep. 17, 2015

Related U.S. Application Data

(60) Provisional application No. 61/987,090, filed on May 1, 2014.

(51) Int. Cl.
*G06Q 40/04* (2012.01)
*G06Q 40/06* (2012.01)
*G06Q 40/00* (2012.01)

(52) U.S. Cl.
CPC .................... *G06Q 40/04* (2013.01)

(58) Field of Classification Search
CPC ......... G06Q 40/04; G06Q 40/06; G06Q 40/00
USPC .............................................................. 705/37
See application file for complete search history.

(56) References Cited

U.S. PATENT DOCUMENTS 8,078,521 B1 *  12/2011  Williams et al. ............... 705/37
2006/0173761 A1 *  8/2006  Costakis .......................... 705/35

* cited by examiner

*Primary Examiner* — Hai Tran
(74) *Attorney, Agent, or Firm* — DLA Piper LLP (US)

(57) ABSTRACT

Systems and methods for electronic transformation of a portfolio via an electronic exchange server are provided. The electronic exchange server transforms an initial portfolio (e.g., a non-hedged trading portfolio) into a transformed portfolio (e.g., a hedged trading portfolio) by receiving buy or sell orders of an initial portfolio to be transformed, determining an imbalance in the received buy or sell orders, and receiving offsetting buy or sell orders to offset the imbalance. The transformation can be performed, for example, by comparing data from the buy or sell orders with data from the offsetting buy or sell orders, pairing the buy or sell orders with the offsetting buy or sell orders, determining a final auction price, determining an adjustment amount, applying the adjustment amount to the final auction price to determine a final settlement price, and applying the final settlement price to the initial portfolio.

17 Claims, 2 Drawing Sheets

SYSTEMS AND METHODS FOR TRANSFORMING TRADING PORTFOLIOS

TECHNICAL FIELD

Embodiments of the disclosure relate generally to systems and methods of transforming data defining one or more initial portfolios (e.g., non-hedged trading portfolios) into data defining one or more transformed portfolios (e.g., hedged trading portfolios), for example, in connection with the hedging of at least a portion of a futures contracts portfolio.

BACKGROUND

Problems exist in the field of electronic portfolio management, for example, electronic management of futures contracts portfolios, where fixings processes that are used to determine the market price of an underlying asset to futures contracts during a period of time may not be credible and may not be an accurate representation of the market price of the underlying asset during a fixings time. These problems include, for example, an inability to transform an initial trading portfolio (e.g., a non-hedged portfolio) into, for example, a trading portfolio that is adequately hedged, namely, a transformed trading portfolio (e.g., a hedged portfolio). Such a transformation may be desired, for example, to allow hedging of at least a portion of a portfolio against a "fixings basis" (e.g., a difference between a fixings price (a price resulting from an auction held at a specific time) and an actual market price at the time of fixings) of the underlying asset.

Accordingly, there is a need for systems and methods of transforming one or more initial (e.g., non-hedged) trading portfolios into one or more transformed (e.g., hedged) trading portfolios that solve these and other problems.

SUMMARY

The present disclosure relates to systems and methods of transforming data defining an initial portfolio (e.g., a non-hedged trading portfolio) into data defining a transformed portfolio (e.g., a hedged trading portfolio), for example, in connection with the hedging of at least a portion of a futures contracts portfolio, via an electronic exchange system. Such a system (and corresponding methods) may be configured to receive one or more buy or sell orders of an initial portfolio to be transformed, determine an imbalance in orders of the received one or more buy or sell orders, receive one or more offsetting buy or sell orders that offset the imbalance, compare data from the one or more buy or sell orders with data from the one or more offsetting buy or sell orders, pair the one or more buy or sell orders with the one or more offsetting buy or sell orders until the imbalance is completely offset; determine a final auction price based on the paired orders, determine an adjustment amount, apply the adjustment amount to an initial settlement price to determine a final settlement price, and apply the final settlement price to the initial portfolio to transform the initial portfolio into a transformed portfolio.

BRIEF DESCRIPTION OF THE DRAWINGS

The present disclosure is illustrated by way of example, and not by way of limitation, and will become apparent upon consideration of the following detailed description, taken in conjunction with the accompanying drawings, in which like reference characters refer to like parts throughout, and in which.

DETAILED DESCRIPTION

Figure 1:
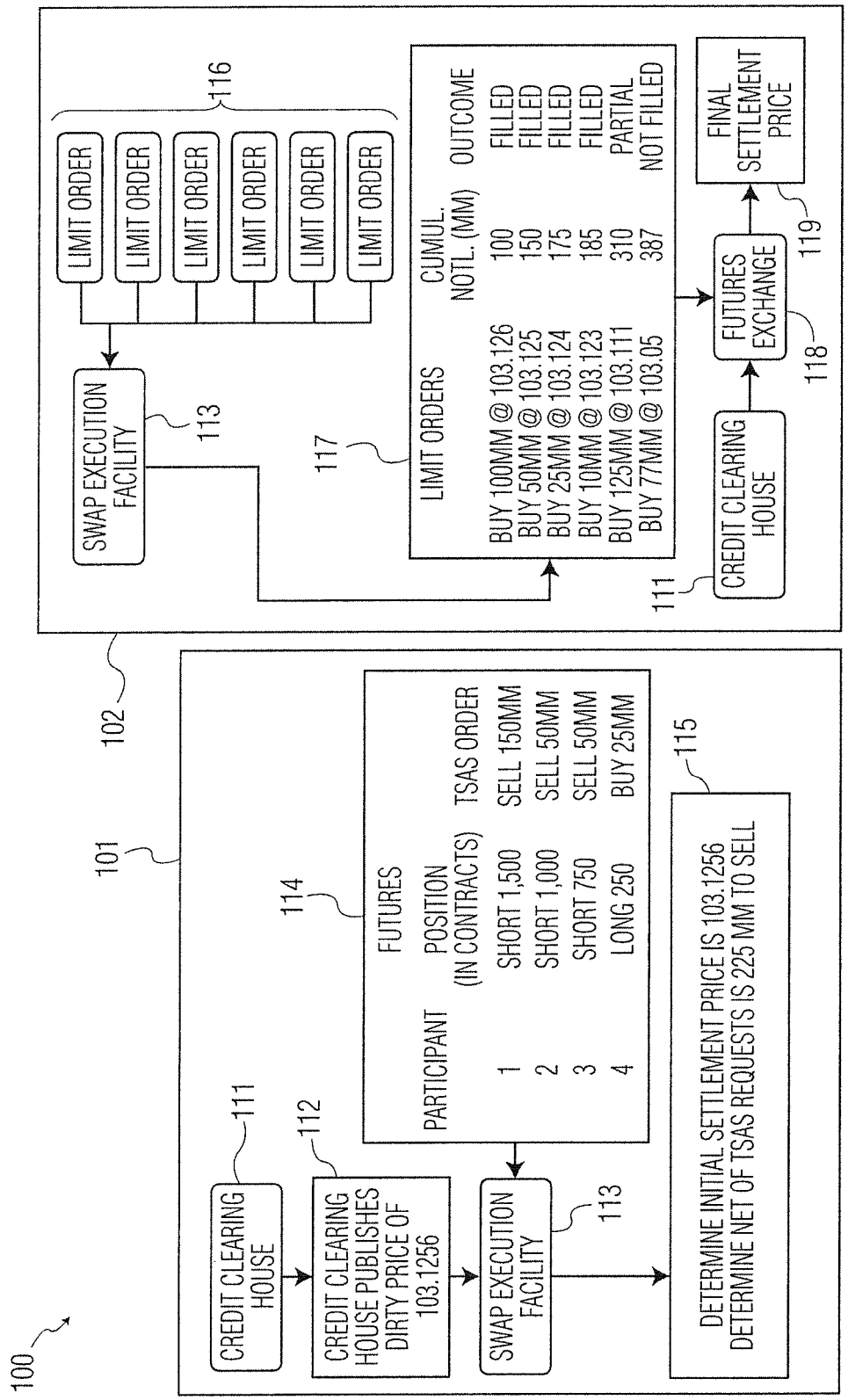
FIG. 1 is a flow diagram illustrating an exemplary system and method configured for transforming a non-hedged trading portfolio into a hedged portfolio, including a Pre-Auction Phase, an Auction Phase One, and an Auction Phase Two, according to an exemplary embodiment of the present disclosure.

Embodiments of the disclosure provide systems and methods of transforming data defining an electronic initial portfolio (e.g., a non-hedged trading portfolio) into a data defining an electronic transformed portfolio (e.g., a hedged trading portfolio), for example, in connection with the hedging of at least a portion of a futures contracts portfolio against the fixings price of an underlying asset.

The term "electronic exchange server" shall refer to any type of a computing device. The electronic exchange server may comprise one or more processors configured to execute instructions stored in a non-transitory memory. The electronic exchange server may be configured to place orders in connection with financial instruments over a network when the instructions are executed. An electronic exchange server may be embodied on a single computing device, while in other embodiments, an electronic exchange server may refer to a plurality of computing devices housed in one or more facilities that are configured to jointly provide local or remote computing services to one or more users or user devices. The electronic exchange server may send and receive data from user devices, data servers, or any other type of computing devices or entities over the Internet, over a Wi-Fi connection, over a cellular network or via any other wired or wireless connection or network known in the art.

The term "electronic exchange" shall refer to any device, system or venue that is capable of carrying out electronic asset exchange transactions. For example, electronic exchange may refer to a commodities exchange, a futures execution facility, an options exchange, a cash equities exchange, a swap execution facility, an unregulated electronic transaction execution venue or any other type of an exchange venue known in the art.

The term "computer" shall refer to any electronic device or devices, including those having capabilities to be utilized in connection with an electronic exchange system, such as any device capable of receiving, transmitting, processing and/or using data and information. The computer may comprise a server, a processor, a microprocessor, a personal computer, such as a laptop, palm PC, desktop or workstation, a network server, a mainframe, an electronic wired or wireless device, such as for example, a telephone, a cellular telephone, a personal digital assistant, a smartphone, an interactive television, such as for example, a television adapted to be connected to the Internet or an electronic device adapted for use with a television, an electronic pager or any other computing and/or communication device.

The term "network" shall refer to any type of network or networks, including those capable of being utilized in connection with an electronic exchange system, such as, for example, any public and/or private networks, including, for instance, the Internet, an intranet, or an extranet, any wired or wireless networks or combinations thereof.

The term "asset" shall refer to any type of financial instrument, such as, without limitation, outright options, spread options, option combinations, commodities, derivatives, shares, bonds and currencies. The term "derivatives" shall further refer to any type of options, caps, floors, collars, structured debt obligations and deposits, swaps, futures, forwards and various combinations thereof or any other type of financial instruments that derive from another underlying financial instrument.

The term "trade" shall refer to any type or part of a transaction or exchange that may occur in connection with one or more financial instruments.

The term "user interface" shall refer to any suitable type of device, connection, display and/or system through which information may be conveyed to a user, such as, without limitation, a monitor, a computer, a graphical user interface, a terminal, a screen, a telephone, a personal digital assistant, a smartphone, or an interactive television.

An exemplary system and method according to this disclosure may provide for the transformation of a non-hedged electronic portfolio into a hedged electronic portfolio, for example, in connection with the hedging of at least a portion of a futures contracts portfolio against the fixings price of an underlying asset. An exemplary system, comprising one or more computer devices each comprising a processing component executing computer-readable instructions, may first determine a time period (window) for submission of one or more buy orders and/or one or more sell orders of the non-hedged portfolio to be hedged. For example, one or more market participants may submit a portion of a non-hedged electronic portfolio, e.g., one or more buy orders and/or one or more sell orders. The buy and/or sell orders may be Trade Swap at Settlement (TSAS) orders, for example. The exemplary system may then receive the submission(s) of the one or more buy orders and one or more sell orders during the specified or predetermined time period (window). The exemplary system may then compare and pair at least one of the one or more buy orders with at least one of the one or more sell orders. The exemplary system may then determine an imbalance in the buy and sell order pairs, for example, the imbalance in amount (or notional) between the submitted buy orders and the submitted sell orders. The exemplary system may then request and/or receive offsetting buy or sell orders, for example, to fulfill or offset the imbalance. For example, if there is a buy imbalance, the system may receive offsetting (complementary) sell orders with sufficient quantity, volume, etc. to completely offset the imbalance, and vice versa. The offsetting buy or sell orders may be limit orders in one embodiment. The exemplary system may then transform the electronic non-hedged portfolio into hedged electronic portfolio, for example, by comparing data defining the one or more buy and sell orders with data defining the one or more offsetting buy or sell orders, and then determining a final auction price based on the comparison. In an exemplary embodiment, the final auction price may be determined by sorting the offsetting buy or sell orders (e.g., the limit orders), for example, from best price to worst price (e.g., highest to lowest or lowest to highest, as the case may be), and pairing the sorted offsetting buy or sell orders with the received buy or sell orders (e.g., the TSAS orders). The final auction price could then be identified as the price of the final offsetting buy or sell order (e.g., the limit order) used to completely offset the imbalance. The exemplary system may then determine an adjustment amount based on the final auction price and a fixings price (e.g., taking a difference between the final auction price and the fixings price). Next, the exemplary system may apply the adjustment amount to the fixings price to determine a final settlement price used for settlement of the hedged portfolio. The exemplary system may apply the final settlement price to the non-hedged portfolio to transform the non-hedged portfolio into the hedged portfolio.

In an embodiment, the final auction price is the price at which all of the imbalance in amount can be offset. In some embodiments, the final auction price and the final settlement price of the hedged portfolio can end up being the same value. A central server can receive all orders used to determine the imbalance amount and the orders needed to ensure that the entire imbalance amount can be offset. The server can determine which orders are traded and at what price. In the event that more than one order can be used to offset the imbalance, the server may determine what percentage of a set of orders (e.g., ranging from 0% to 100% of each order) may be used to offset the imbalance, using a pre-defined algorithm or algorithms. The adjustment amount may be the difference between the fixings price and the final auction price.

In one exemplary embodiment of the present disclosure, an exemplary system and method provides for additional steps after the fixings of the underlying asset has occurred, for example, to allow futures market participants that will hold futures positions to final settlement an opportunity to attempt to hedge the fixings basis, by entering into a contract to buy or sell the underlying asset of the futures contract at the same price that is used to cash settle their futures position.

For example, assuming that a buyer has bought X number of cash settled futures contracts at a cost of $Y (USD) per contract and the buyer intends to hold the futures contracts to maturity, the buyer may be at risk that the final settlement price is lower than the price at which the underlying asset is trading in the market at that time. As a result, the buyer may receive too little money at settlement. At maturity of the futures contracts, the price of the futures contracts and the underlying asset should be the same (otherwise, there may be an arbitrage opportunity). This will enable the buyer to buy an equivalent amount of the asset that underlies the futures contract at the equivalent price, so long as that market has enough sellers that are interested in selling at that same final settlement price.

In an exemplary embodiment, the present disclosure may operate in two (2) phases, described below:

Phase One

In the first phase, market participants that will hold their futures positions to maturity may be provided with a window of time to indicate whether they wish to attempt to hedge against the fixings basis or not. The market participants that wish to hedge may indicate the amount of their position that they wish to hedge. These indications may be referred to as "Trade Swap At Settlement" (TSAS) orders. If an underlying trade swap is mandated to trade on a swap execution facility (SEF), or other execution venue, any order information may be presented to the SEF, or other execution venue nominated by an exchange as the location for performing the "final settlement auction."

In an embodiment, the SEF, or other execution venue, may be required to maintain rules that prohibit the submission of a TSAS order that exceeds a size of the futures position held by a futures market participant. The SEF, or other execution venue, may also prohibit the submission of orders that offset of the position held by the futures market participant. These restrictions may help ensure that the final settlement price is not manipulated. In another embodiment, if the underlying contract of the futures contract is not a swap contract that is subject to the mandatory SEF trading requirement, the underlying contract may not be required to trade on an SEF. The SEF, or other execution venue, may also require the auditing of the books and records post-auction of the futures market participant that enters a TSAS order, for example to ensure that the market participant accurately represented their position and the SEF may be able to take disciplinary action in the event that this was not the case.

At the end of the time window for submission of TSAS orders (for example, from 8 am to 4:30 pm on the final settlement date), the buy TSAS orders are paired with the sell TSAS orders. In one embodiment, if a buy TSAS notional is equal to a sell TSAS notional, then the final settlement price may be determined to be the same as the underlying asset fixings price. In another embodiment, if there is more buy (or sell) TSAS notional than sell (or buy) TSAS notional, then the amount of imbalance may be determined and published on a public location (e.g. a website), along with the fixings price determined for the underlying asset.

Phase Two

Following the publication of the imbalance (referred to herein as the "net open interest of TSAS") and the fixings price (also referred to as "initial settlement price"), there may be a period of time where limit orders are accepted into an order book. In one embodiment, only limit orders that can offset (complement) the net open interest of TSAS are accepted. This is because the other side of the imbalance from the first period is being sought. For example, no market participant that entered a TSAS order may enter an order into Phase Two of the auction, unless the order is of the same type (e.g., buy or sell) as that entered during Phase One.

At the end of the period of time during which limit orders may be submitted, the submitted limit orders may be sorted from best to worst price (e.g., highest price to lowest price or lowest price to highest price, as the case may be), and paired (e.g., filled) in that order against the net open interest in TSAS orders submitted during Phase 1. The price of the final limit order used to completely offset the net open interest in TSAS may be referred to as the final auction price. The difference between the two prices (i.e., the difference between the final auction price and fixings price) may then be applied as an adjustment to the fixings price to determine a final settlement price used for settlement of the underlying futures positions.

Turning now to FIG. 1, a flow diagram illustrating a system and method 100 for transforming a non-hedged trading portfolio into a hedged portfolio, including an Auction Phase One 101 and an Auction Phase Two 102, according to an exemplary embodiment of the present disclosure is shown.

During Auction Phase One 101, a credit clearing house 111 may run its daily process to determine the settlement prices for cleared transactions (e.g., from 4:30 to 4:35 pm). The credit clearing house 111 may publish 112 the "dirty" price (e.g., initial settlement price), in this example an initial settlement price of $103.1256 (USD). Notably, the initial settlement price may also be referred to as a fixings price. A swap execution facility 113 (SEF) may receive the "dirty" or initial settlement price (e.g., at 4:50 pm). Prior to receiving the "dirty" or initial settlement price, during a pre-determined time period or window (e.g., from 8:00 am to 4:30 pm), the swap execution facility 113 may accept Trade Swap at Settlement (TSAS) requests from one or more participants holding futures positions to maturity/expiry. The participants may request buy and/or sell trade swaps up to the same amount of notional that represents their open interest (e.g., any imbalance) at the end of trading. The swap execution facility 113 may publish the initial settlement price received from the credit clearing house 111 and determine 115 a net of all received TSAS requests (e.g., at or after 4:50 pm).

In this embodiment, for example, the swap execution facility 113 may receive the following TSAS requests 114: a sell order of 150 MM (million) from Participant 1; a sell order of 50 MM (million) from Participant 2; a sell order of 50 MM (million) from Participant 3; and a buy order of 25 MM (million) from Participant 4. The initial settlement price is $103.1256 (USD) and the net open interest (i.e., imbalance) of TSAS requests is 225 MM to sell.

During Auction Phase Two 102, the swap execution facility 113 may collect limit orders 116 to offset the net TSAS requests from Auction Phase One 101 (e.g., from 4:50 pm to 5:00 pm). The credit clearing house 111 may then provide an initial settlement price to the futures exchange 118 (e.g., at 4:50 pm). The swap execution facility 113 may pair 117 the TSAS requests and received limit orders to determine a final auction price, which in this example is the price of the final limit order used to completely offset the net open interest in TSAS requests (in this example, the final auction price is $103.111 (USD)). The final auction price may then be used to determine an additional adjustment amount (in this example, the final auction price $103.111 minus the initial settlement price $103.1256 equals −$0.0145). The futures exchange 118 may then adjust the initial settlement price by the adjustment amount determined by the Auction Phase One 101 and Auction Phase Two 102 to determine a final settlement price 119, and then publish the final settlement price (e.g., at 5:01 pm). This final settlement price is the price at which the futures exchange 111 will settle its open positions. Optionally, the futures exchange 118 may apply and publish an adjustment to a final settlement price (e.g., before 4:25 pm) to account for i) futures not having paid coupons during the life of the futures contract (plus interest), and ii) any credit events that have occurred and where the auction occurred prior to the last trading day (plus interest). The futures exchange 118, the credit clearing house 111, and the swap execution facility 113 may communicate with each other over one or more networks.

Figure 2:
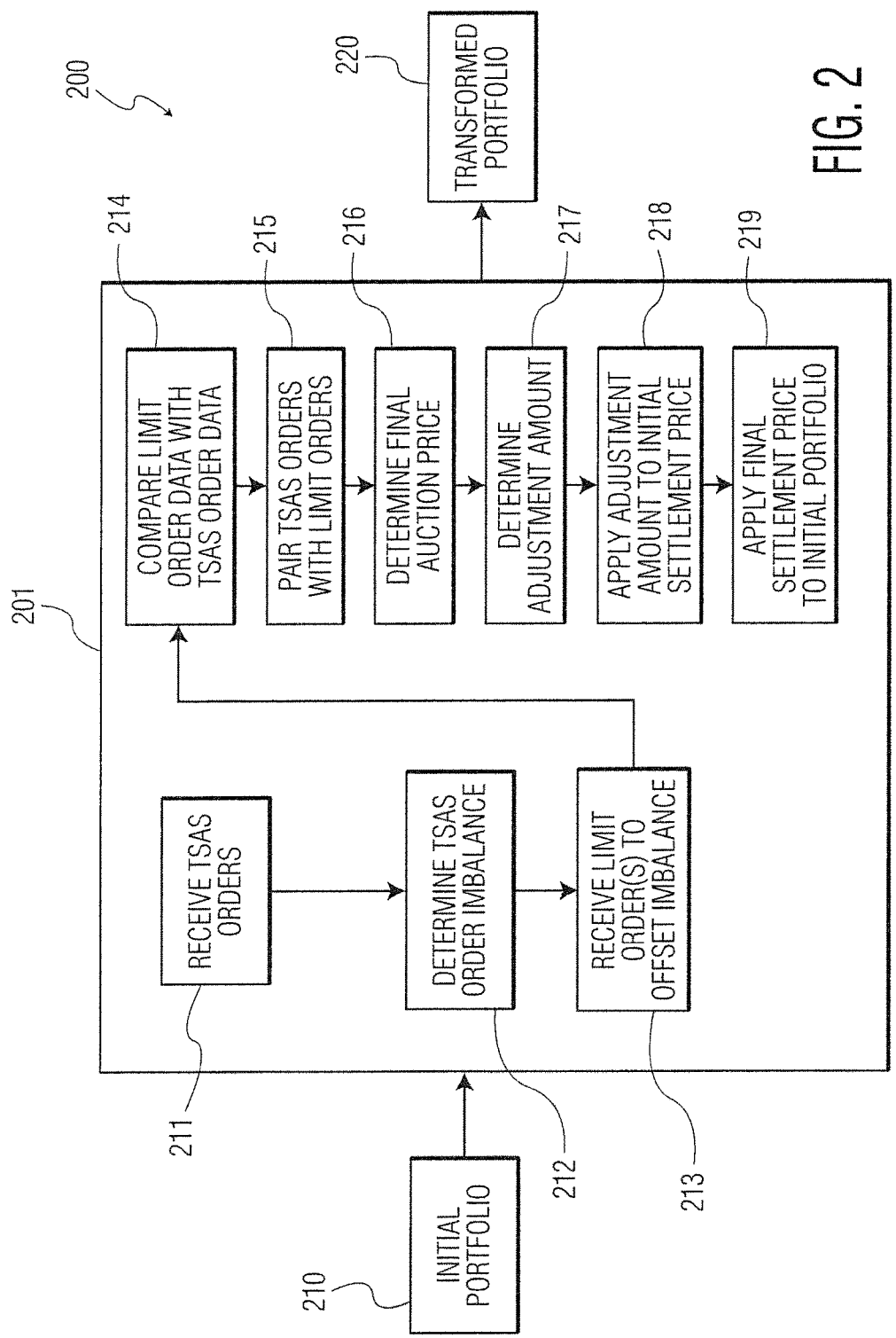
FIG. 2 is a flow diagram illustrating an exemplary system and method configured for transforming an initial portfolio into a transformed portfolio, according to an exemplary embodiment of the present disclosure.

Turning now to FIG. 2, a flow diagram 200 illustrating an exemplary system and method 201 configured for transforming an initial portfolio 210 into a transformed portfolio 220, according to an exemplary embodiment of the present disclosure is shown. The exemplary system 201 may comprise the steps of receiving 211 data defining buy or sell Trade Swap at Settlement (TSAS) Orders of the initial electronic portfolio 210; determining 212 the existence of an TSAS Order imbalance by comparing buy and sell TSAS orders; receiving 213 data defining offsetting buy or sell limit orders to offset the TSAS order imbalance; comparing 214 data from the received TSAS Orders with data from the received limit orders; pairing 215 the TSAS orders with the offsetting limit orders; determining 216 a final auction price; determining 217 an adjustment amount; applying 218 the adjustment amount to an initial settlement price to determine a final settlement price; and applying 219 the final settlement price to the initial portfolio 210 to transform the initial portfolio 210 into a transformed portfolio 220.

In an embodiment, the initial portfolio may be a non-hedged trading portfolio and the transformed portfolio may be a hedged trading portfolio. The transformation from a non-hedged trading portfolio into a hedged trading portfolio may allow market participants, for example, participants in futures contracts trading, to hedge their portfolio against the risk of loss due to the market price during a period of time.

The present disclosure may also be utilized in other implementations. For example, the present systems and methods may cover the final settlement price for any futures contract that is cash settled where there is a market for trading the underlying contract, regardless of whether the underlying contract is a swap contract or not. For example, the underlying asset may be a broad range of potential underlyings, including, without limitation, securities, swaps, forwards, and all other types of OTC derivatives, as well as cash markets for physical commodities.

An electronic system may embody, include and/or perform the various functions and features described herein, and include, for example, hardware and software components. For illustration purposes, an exemplary electronic system according to this disclosure may comprise (without limitation) one or more computer devices, each comprising a processor configured to execute computer-readable instructions. When executed, the computer-readable instructions may cause the electronic system to perform any or all of the methods, processes, functions and/or operations described herein. The electronic system may optionally comprise one single, co-located system components, or it may comprise multiple independent sub-systems, at various locations, coupled and configured to operate together. For systems including multiple computing devices, the computing devices may be configured to communicate with each other via a wired and/or wireless network. For purposes of this disclosure, a computer device may include (without limitation) a computer terminal, a server, a mobile communication device, a desktop computer, a smart phone, a PDA (personal data assistant), a mobile computer, a tablet computer, or any other such device configured to perform one or more of the functions or operations described herein.

The invention claimed is:

1. A system for transforming an initial portfolio into a transformed portfolio that is balanced and priced according to current real-time pricing data, said initial portfolio having an initial settlement price, the system comprising:
    an electronic exchange server comprising one or more computer devices, each comprising a processing component executing computer-readable instructions that causes the electronic server to:
    receive one or more buy or sell orders of the initial portfolio to be transformed;
    determine an imbalance of the received one or more buy or sell orders;
    define a predefined time window during which one or more offsetting buy or sell orders will be accepted;
    transmit a message, over an Internet communication channel, to at least one remote subscriber computer, said message comprising a request for submission of the one or more offsetting buy or sell orders during the predefined time window;
    receive the one or more offsetting buy or sell orders to offset the imbalance during or before the predefined time window, said offsetting buy or sell orders comprising current real-time pricing data;
    pair, after a conclusion of the predefined time window, the one or more buy or sell orders with the one or more offsetting buy or sell orders until the imbalance is completely offset;
    determine a final auction price based on the paired orders, said final auction price reflective of the current real-time pricing data;
    determine an adjustment amount based on the final auction price;
    apply the adjustment amount to the initial settlement price to determine a final settlement price; and
    apply the final settlement price to the initial portfolio, thereby transforming the initial portfolio into the transformed portfolio that is balanced and priced according to the current real-time pricing data.

2. The system of claim 1, wherein the processing component executes computer-readable instructions that further causes the electronic server to:
    sort the one or more offsetting buy or sell orders, according to price, from highest price to lowest price or vice versa; and
    pair the received buy or sell orders with the sorted offsetting buy or sell orders.

3. The system of claim 1, wherein the one or more buy or sell orders comprise Trade Swap at Settlement (TSAS) orders, and the one or more offsetting buy or sell orders comprise limit orders.

4. The system of claim 3, wherein the Trade Swap at Settlement (TSAS) orders are traded on a swap execution facility (SEF).

5. The system of claim 4, wherein the swap execution facility (SEF) prevents submission of one or more Trade Swap at Settlement (TSAS) orders that exceed a size of the initial portfolio.

6. The system of claim 1, wherein if the one or more buy orders have a notional that is equal to a notional of the one or more sell orders, a final settlement price of the transformed portfolio is determined to be an underlying asset fixings price.

7. The system of claim 1, wherein the processing component executes computer-readable instructions that further causes the electronic server to:
    determine a time period for submission of the one or more buy or sell orders or the one or more offsetting buy or sell orders.

8. The system of claim 1, wherein the adjustment amount comprises a difference between the final auction price and the initial settlement price.

9. A computer-implemented method for transforming, via an electronic exchange server, an initial portfolio into a transformed portfolio that is balanced and priced according to current real-time pricing data, said initial portfolio having an initial settlement price, the electronic exchange server comprising one or more computer devices, each comprising a processing component executing computer-readable instructions that cause the electronic exchange server to perform the steps of:
    receiving, by the electronic exchange server, one or more buy or sell orders of the initial portfolio to be transformed;
    determining, by the electronic exchange server, an imbalance in orders of the received one or more buy or sell orders;
    defining, by the electronic exchange server, a predetermined time window during which one or more offsetting buy or sell orders are received;
    transmitting a message, by the electronic exchange server over an Internet communication channel, to at least one remote subscriber computer, said message comprising a request for submission of the one or more offsetting buy or sell orders during the predefined time window;

receiving, by the electronic exchange server, the one or more offsetting buy or sell orders to offset the imbalance during or before the predefined time window, said offsetting buy or sell orders comprising current real-time pricing data;

pairing, by the electronic exchange server, after a conclusion of the predefined time window, the one or more buy or sell orders with the one or more offsetting buy or sell orders until the imbalance is completely offset;

determining, by the electronic exchange server, a final auction price based on the paired orders, said final auction price reflective of the current real-time pricing data;

determining, by the electronic exchange server, an adjustment amount based on the final auction price;

applying, by the electronic exchange server, the adjustment amount to the initial settlement price to determine a final settlement price; and applying, by the electronic exchange server, the final settlement price to the initial portfolio, thereby transforming the initial portfolio into the transformed portfolio that is balanced and priced according to the current real-time pricing data.

10. The method of claim 9, further comprising:
sorting, by the electronic exchange server, the one or more offsetting buy or sell orders, according to price, from highest price to lowest price or vice versa; and
pairing, by the electronic exchange server, the received buy or sell orders with the sorted offsetting buy or sell orders.

11. The method of claim 9, wherein the one or more buy or sell orders comprise Trade Swap at Settlement (TSAS) orders, and the one or more offsetting buy or sell orders comprise limit orders.

12. The method of claim 11, wherein the Trade Swap at Settlement (TSAS) orders are traded on a swap execution facility (SEF).

13. The method of claim 12, wherein the swap execution facility (SEF) prevents submission of one or more Trade Swap at Settlement (TSAS) orders that exceed a size of the initial portfolio.

14. The method of claim 9, wherein if the one or more buy orders comprise a notional that is equal to a notional of the one or more sell orders, a final settlement price of the transformed portfolio is determined to be an underlying asset fixings price.

15. The method of claim 9, further comprising:
determining, by the electronic exchange server, a time period for submission of the one or more buy or sell orders or the one or more offsetting buy or sell orders.

16. The method of claim 9, wherein the adjustment amount comprises a difference between the final auction price and the initial settlement price.

17. A non-transitory computer-readable storage medium programmed to include instructions that, when executed by a processing device, cause the processing device to facilitate asset based transactions according to a method comprising the steps of:

receiving one or more buy or sell orders of an initial portfolio to be transformed, said initial portfolio having an initial settlement price;

determining an imbalance in the received one or more buy or sell orders;

defining a predefined time window during which one or more offsetting buy or sell orders are accepted;

transmitting a message, over an Internet communication channel, to at least one remote subscriber computer, said message comprising a request for submission of the one or more offsetting buy or sell orders during the predefined time window;

receiving the one or more offsetting buy or sell orders to offset the imbalance during or before the predefined time window, said offsetting buy or sell orders comprising current real-time pricing data;

pairing, after a conclusion of the predefined time window, the one or more buy or sell orders with the one or more offsetting buy or sell orders until the imbalance is completely offset;

determining a final auction price based on the paired orders, said final auction price reflective of the current real-time pricing data;

determining an adjustment amount based on the final auction price;

applying the adjustment amount to the initial settlement price to determine a final settlement price; and applying the final settlement price to the initial portfolio, thereby transforming the initial portfolio into a transformed portfolio that is balanced and priced according to the current real-time pricing data.

* * * * *